United States Patent [19]

Takahashi et al.

[11] Patent Number: 4,661,946

[45] Date of Patent: Apr. 28, 1987

[54] DIGITAL SWITCH MODULE HAVING ENCODING LAW CONVERSION CAPABILITY

[75] Inventors: Atsuhisa Takahashi, Kawasaki; Takashi Nara, Yokohama; Masami Murayama, Yokohama; Hiroaki Takeichi, Yokohama, all of Japan

[73] Assignee: Fujitsu Limited, Kawasaki, Japan

[21] Appl. No.: 738,763

[22] Filed: May 29, 1985

[30] Foreign Application Priority Data

May 29, 1984 [JP] Japan ................ 59-107516

[51] Int. Cl.$^4$ ............... H04Q 11/04; H04B 14/06
[52] U.S. Cl. ........................ 370/58; 375/30
[58] Field of Search ............ 370/58, 104; 375/30

[56] References Cited

U.S. PATENT DOCUMENTS

| | | | |
|---|---|---|---|
| 4,037,226 | 7/1977 | Betts et al. | 375/30 |
| 4,311,988 | 1/1982 | Kelley et al. | 375/30 |
| 4,370,632 | 1/1983 | Allgood et al. | 375/30 |
| 4,399,534 | 8/1983 | Simmons et al. | 370/58 |

FOREIGN PATENT DOCUMENTS 0028104 5/1981 European Pat. Off. .

OTHER PUBLICATIONS

"Transmission Performance of Telephone Connections Involving Digital Signal Processing Devices", Bell-Northern Research, Ottawa, Canada, IEEE, 1980, pp. 20.2.1–20.2.5.

"Digital Switch Digitalks", Ernst A. Munter, Nov. 1962, pp. 15–23.

"An Intelligent Network Processor for a Digital Central Office", H. G. Alles, Bell Laboratories, pp. A5.-1–A5.6.

Patent Abstracts of Japan, vol. 2, No. 35, Mar. 1978, Kokai No. 53-903.

CCITT, vol. III, Fascicle III.3, Geneva, 1981.

Primary Examiner—Douglas W. Olms
Assistant Examiner—Frank M. Scutch, III
Attorney, Agent, or Firm—Staas & Halsey

[57] ABSTRACT

A digital switch module for a time division digital switching system includes an encoding law conversion memory and a control memory. The encoding law conversion memory has previously stored therein conversion data for converting between different types of encoding laws. For example, the A-law and μ-law encoding laws set forth in CCITT Recommendation G.711 can be converted by a digital switch module according to the present invention. The encoding law conversion memory includes a read only memory having regions for conversion between A-law and μ-law encoded data and for nonconversion of both A-law and μ-law encoded data. The control memory designates which of the regions in the encoding law conversion memory is to be used during each time slot, thus dynamically controlling whether data passing through the digital switch module is converted or not. The type of conversion or nonconversion designated by the control memory can be determined by the type of data, e.g., digitized voice signals may require conversion but non-voice signals will not be converted, and the channel path of the data, for example from an A-law encoded system to a μ-law encoded system.

19 Claims, 5 Drawing Figures

DIGITAL SWITCH MODULE HAVING ENCODING LAW CONVERSION CAPABILITY

BACKGROUND OF THE INVENTION

1. Field of the Invention

The present invention relates to a digital switch module which performs switching and, as necessary, encoding law conversion, of digital signals in a time division multiplexed system.

2. Description of the Related Art

It is a conventional practice to digitize voice signals according to encoding law in, for example, a telephone system. These digitized voice signals can then be mixed with other digital signals, such as computer or other data signals, in a digital transmission network. Switching is commonly performed in such digital transmission networks using time division multiplexed switch modules which operate on pulse code modulated (PCM) signals during individual time slots.

Standardized encoding laws known as A-law and $\mu$-law are included in "CCITT Yellow Book, Volume III—Fascicle III 3, Digital Networks Transmission Systems and Multiplexing Equipment, Recommendations G.701–G.941, VIIth Plenary Assembly Geneva, November 10-21, 1980". Recommendation G.711 sets forth A- and $\mu$-laws for digitizing a voice signal. In order for a digital switching network to handle voice signals encoded according to both A-law and $\mu$-law, it is necessary to convert from one encoding law to the other when switching from an input channel which uses one of the encoding laws to an output channel which uses the other of the encoding laws.

Conventionally, conversion from one encoding law to the other is performed by converting the input data signal from the first encoding law to an analog signal and then re-encoding the analog signal according to the second encoding law. This process has difficulties not found in an all-digital system and typically requires more expensive equipment than an all digital system. Therefore, it would be preferable to convert data signals from one encoding law to another without conversion to an analog signal.

According to CCITT Recommendation G.732, A-law encoding is used in PCM systems operating at 2048 kbits/s with 30 channels per system. According to CCITT Recommendation G.733, $\mu$-law encoding is used in PCM systems operating at 1544 kbits/s with 24 channels per system. In order to match the number of channels when interfacing the above two PCM systems, four A-law PCM systems and five $\mu$-law PCM systems are required. Thus, both the A-law and $\mu$-law encoded systems will have a total capacity of 120 channels. Since coding conversion must be carried out at the interface between the two systems, a large number of code converters are required. If a switching system which converts to analog signals is used between the two systems, the interface equipment will be very expensive. Furthermore, it is difficult to switch non-voice data signals together with encoded voice signals since the non-voice signals cannot be converted without destroying the data contained therein.

SUMMARY OF THE INVENTION

An object of the present invention is to provide a digital switch module that performs appropriate conversions between digital signals which include encoded voice signals and non-voice signals in an economical and flexible manner.

Another object of the present invention is to previously store conversion data corresponding to every possible conversion pattern between encoding laws, including nonconversion for switching between two systems using identical encoding laws.

A further object of the present invention is to perform level matching simultaneously with encoding law conversion between two digital transmission systems.

The above objects are provided by a digital switch module for time division switching of data between digital channels used for input and output, the switching occurring in time slots and the digital channels having corresponding encoding laws and carrying digitized voice signals. The module includes conversion memory means for converting the digitized voice signals on the digital channels from a first encoding law to a second encoding law, using conversion data previously stored in the conversion memory means, and control memory means for designating the conversion data used by the conversion memory means during each of the time slots in dependence upon the corresponding encoding laws of the digital channels used for input and output during each of the time slots.

According to the present invention it is possible for non-voice data to be sent immediately before or received immediately after voice conversation, even when different encoding laws are used in the network connecting two terminals, provided control signals indicating the type of signals (voice or non-voice) which follow are transmitted. An embodiment of the present invention also controls attenuation of the signals output by the digital switching module to provide level matching between two switching networks connected by the digital switching module.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
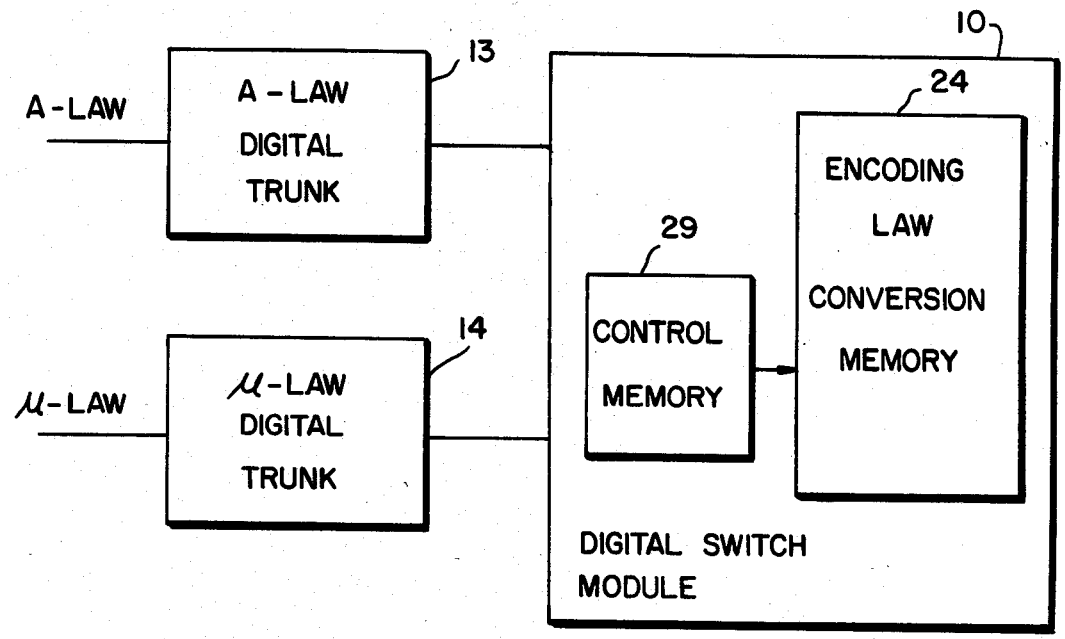
FIG. 1 is a block diagram of an embodiment of the present invention.

As illustrated in FIG. 1, a digital switch module 10, according to the present invention, provides switching between an A-law digital trunk 13 carrying A-law encoded data and a $\mu$-law digital trunk 14 carrying $\mu$-law encoded data. The digital switch module 10 includes a digital encoding law conversion memory 24 which controls encoding law conversion between the A-law and the μ-law trunks 13 and 14. The digital switch module 10 performs time division switching, whereby data is switched from one of the trunks, e.g., 13, to the other trunk 14 in time slots. A control memory 29 controls the conversion performed by the encoding law conversion memory 24 within each time slot.

In one embodiment of the present invention, the digital encoding law conversion memory 24 includes a read only memory (ROM) which contains conversion data for converting between encoding laws. The control memory 29 outputs control data from an address in the control memory 29 corresponding to each of the time slots. Thus, as each time slot occurs, the corresponding control data can be read from the control memory 29 to designate a region of conversion data in the digital encoding law conversion memory 24. The designated region performs the required conversion or nonconversion for the data handled by the encoding law conversion memory 24 during the corresponding time slot.

Figure 2:
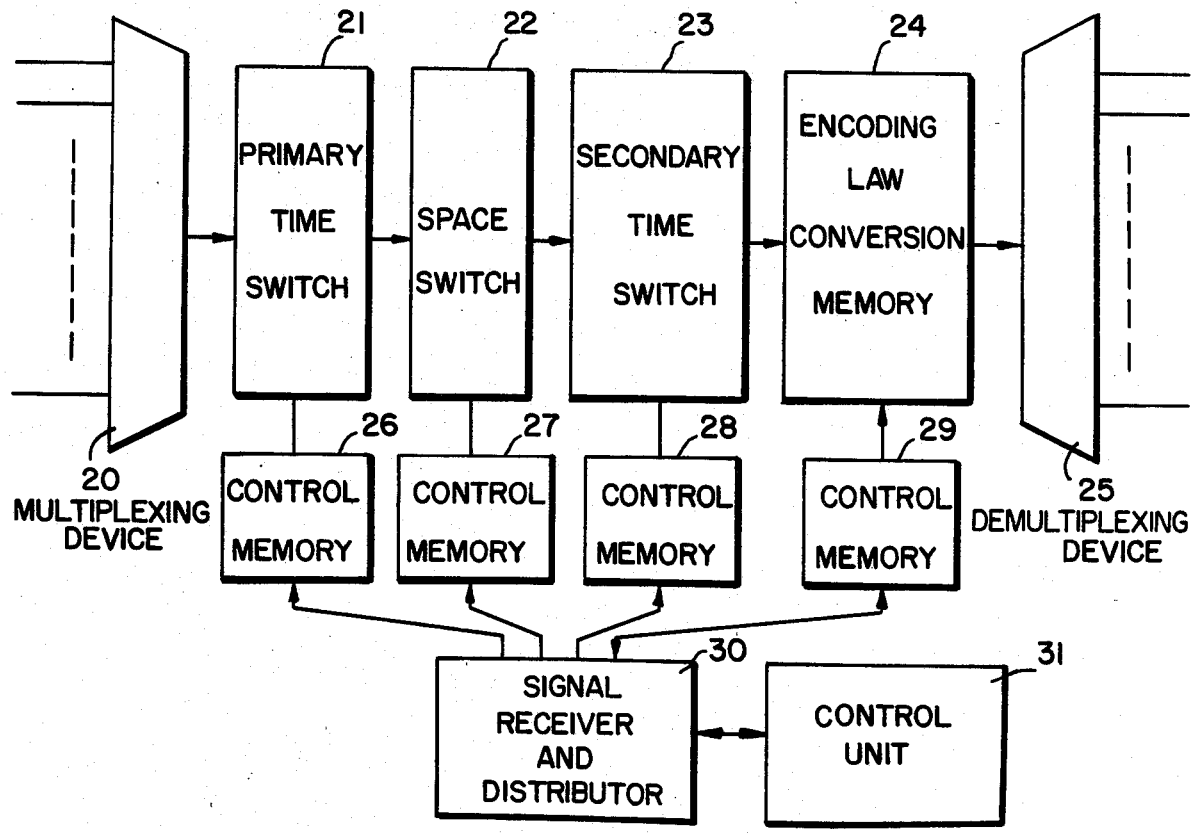
FIG. 2 is a block diagram of an embodiment of the present invention adapted to a digital switching system having a time switch - space switch - time switch structure.

An embodiment of the present invention is included in the time switch - space switch - time switch type digital switch module illustrated in FIG. 2. Control data is transmitted from a control unit 31 to control memories 26-29 via a signal receiver and distributor 30. The control memories 26-28 respectively control a primary time switch 21, space switch 22 and secondary time switch 23 using conventional techniques to provide time division switching of data between a multiplexing device 20 and a demultiplexing device 25. As described above, the control data written to control memory 29 designates one of the following conversions: A-law to μ-law, μ-law to A-law, A-law to A-law or μ-law to μ-law. In one embodiment of the present invention, the control data includes an attenuation value for level matching between the two communications systems connected by the digital switch module. The region designated by the control data from control memory 29 is accessed by a PCM signal during the corresponding time slot to produce appropriately encoded data at the output of the encoding law conversion memory 24.

Figure 3:
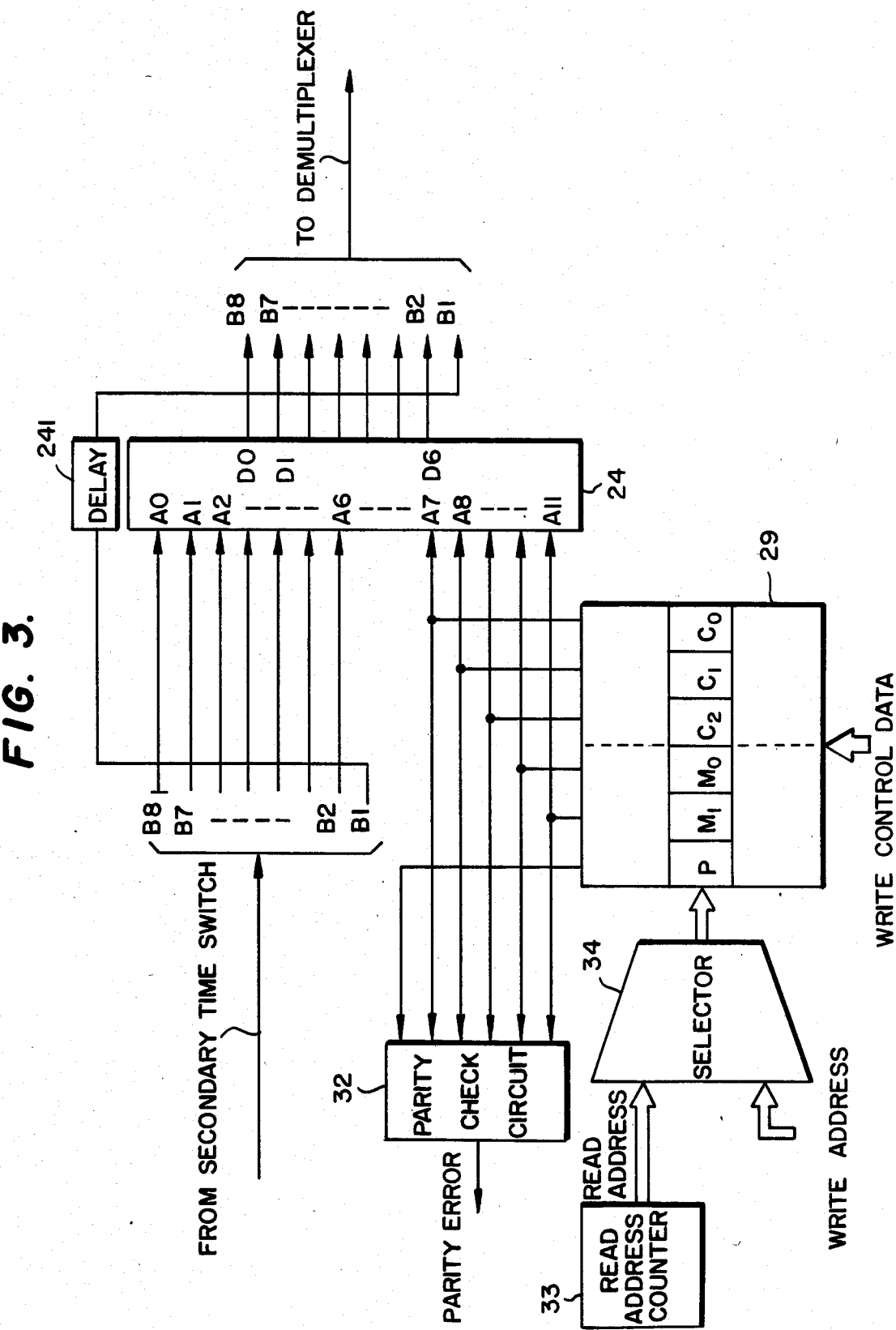
FIG. 3 is a block diagram of a digital encoding law conversion memory and its control memory.

The block diagram in FIG. 3 illustrates further construction details of the encoding law conversion memory 24 and the control memory 29 in the embodiment of FIG. 2. In FIG. 3, the encoding law conversion memory 24 is illustrated as a ROM having a storage capacity of 7 bits by 4 K. The ROM 24 is addressed in part by bits B2-B8 of an 8 bit PCM signal output by the secondary time switch 23 during each time slot. The bits B2-B8 form bits A0-A6 of a partial address in the encoding law conversion memory 24. The remaining address bits A7-A11 of the encoding law conversion memory 24 are formed by 5 bits of the control data output by the control memory 29 for the corresponding time slot. Thus, access to the encoding law conversion memory 24 is made by an address signal of 12 bits (A0-A11).

The ROM produces 7 output bits D0-D6 which are combined with bit B1 of the input PCM signal after bit B1 passes through a delay circuit 241. The resulting 8-bit output data is supplied to the digital channels used for output via the demultiplexer 25. Tables 1 and 2, below, indicate the relationship between decoder output value number and the corresponding 7 bit (B2-B8) signal under A-law and μ-law encoding, respectively. The values indicated in Tables 1 and 2 are from CCITT Recommendation G.711 Table 1a and 2a.

In the embodiment of the digital switch module illustrated in FIG. 3, the control memory 29 is a random access memory having a memory capacity determined by the degree of multiplexing provided by multiplexer 20, for example, 6 bits by 1024. The 6 bits of control data corresponding to each time slot include pad control bits $C_0$, $C_1$ and $C_2$ indicating an attenuation value; pad mode bits $M_0$ and $M_1$ designating the conversion region in the encoding law conversion memory 24; and parity bit p.

TABLE 1

| | A-LAW INPUT | | | | | | |
|---|---|---|---|---|---|---|---|
| No. | B2 (A6 | ... | ... | ... | ... | ... | B8 A0) |
| 128 | 1 | 1 | 1 | 1 | 1 | 1 | 1 |
| ⁄ 113 | 1 | 1 | 1 | 0 | 0 | 0 | 0 |
| ⁄ 97 | 1 | 1 | 0 | 0 | 0 | 0 | 0 |
| ⁄ 81 | 1 | 0 | 1 | 0 | 0 | 0 | 0 |
| ⁄ 65 | 1 | 0 | 0 | 0 | 0 | 0 | 0 |
| ⁄ 49 | 0 | 1 | 1 | 0 | 0 | 0 | 0 |
| ⁄ 33 | 0 | 1 | 0 | 0 | 0 | 0 | 0 |
| ⁄ 2 | 0 | 0 | 0 | 0 | 0 | 0 | 1 |
| 1 | 0 | 0 | 0 | 0 | 0 | 0 | 0 |

Note: The actual character signals on the PCM channel are obtained by inverting the even bits of the above table.

TABLE 2

| | μ-LAW INPUT | | | | | | |
|---|---|---|---|---|---|---|---|
| No. | B2 (A6 | B3 ... | B4 ... | B5 ... | B6 ... | B7 ... | B8 A0) |
| 127 | 0 | 0 | 0 | 0 | 0 | 0 | 0 |
| ⁄ 112 | 0 | 0 | 0 | 1 | 1 | 1 | 1 |
| ⁄ 96 | 0 | 0 | 1 | 1 | 1 | 1 | 1 |
| ⁄ 80 | 0 | 1 | 0 | 1 | 1 | 1 | 1 |
| ⁄ 64 | 0 | 1 | 1 | 1 | 1 | 1 | 1 |
| ⁄ 48 | 1 | 0 | 0 | 1 | 1 | 1 | 1 |
| ⁄ 32 | 1 | 0 | 1 | 1 | 1 | 1 | 1 |
| ⁄ 16 | 1 | 1 | 0 | 1 | 1 | 1 | 1 |
| ⁄ 0 | 1 | 1 | 1 | 1 | 1 | 1 | 1 |

TABLE 3

| MODE DESIGNATION | | |
|---|---|---|
| Conversion of encoding law | M1 (A11) | M0 (A10) |
| A-LAW → A-LAW | 0 | 0 |
| A-LAW → μ-LAW | 0 | 1 |
| μ-LAW → μ-LAW | 1 | 0 |
| μ-LAW → A-LAW | 1 | 1 |

TABLE 4

| PAD VALUE DESIGNATION | | | |
|---|---|---|---|
| ATTENUATION (dB) | $C_2$ (A9) | $C_1$ (A8) | $C_0$ (A7) |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 7 | 1 | 0 | 1 |
| 10 | 1 | 1 | 0 |

TABLE 4-continued

| PAD VALUE DESIGNATION | | | |
|---|---|---|---|
| ATTENUATION (dB) | $C_2$ (A9) | $C_1$ (A8) | $C_0$ (A7) |
| ∞ | 1 | 1 | 1 |

Table 3 is an example of a possible relationship between encoding law conversion and the pad mode bit $M_0$ and $M_1$. Table 4 is an example of the relationship between attenuation value in decibels (dB) and the pad control bits $C_0$, $C_1$ and $C_2$.

The following examples illustrate how the codes listed in Tables 3 and 4 are used to control conversion between encoding laws according to the present invention. In a time slot in which an A-law encoded signal is converted to a $\mu$-law encoded signal and the atennuation value is set to 0 dB, the control data (P, $M_1$, $M_0$, $C_2$, $C_1$ and $C_0$) written in the control memory 29 would be "001000", assuming that odd parity is used. In a time slot in which an A-law encoded signal is input and output without conversion and the attenuation value is set to 3 dB, the data written in the control memory 29 would be "100011", again assumming that odd parity is used.

The transfer of control data from the control memory 29 to the input lines of the ROM 24 for address bits A7–A11 is performed as follows. An address counter 33 generates a read address by counting clock signals. Thus, control data is output from the control memory 29 as the address counter 33 outputs a read address of the control memory 29 that correspond to a time slot and the read address sequentially changes in synchronism with the time slots. The read address is supplied to the control memory 29 via a selector 34 which also receives write addresses from the control unit 31 (FIG. 2). Using the write addresses, control data is written into the control memory 29 from the control unit 31 to provide dynamic control of attenuation and conversion or nonconversion of encoded data.

When the read address is supplied to the control memory 29, the control data ($M_1$, $M_0$, $C_2$, $C_1$, $C_0$) is output and supplied to the input lines for bits A7–A11 of the ROM 24. Simultaneously, the control data is supplied to a parity check circuit 32 which also receives the parity bit P. When a parity error is detected by the parity check circuit 32, a parity error signal is transmitted to the control unit 31 via the signal receiver and distributor 30. In response to the parity error signal, the control unit 31 performs procedures for suspending use of the current time slot.

Figure 4:
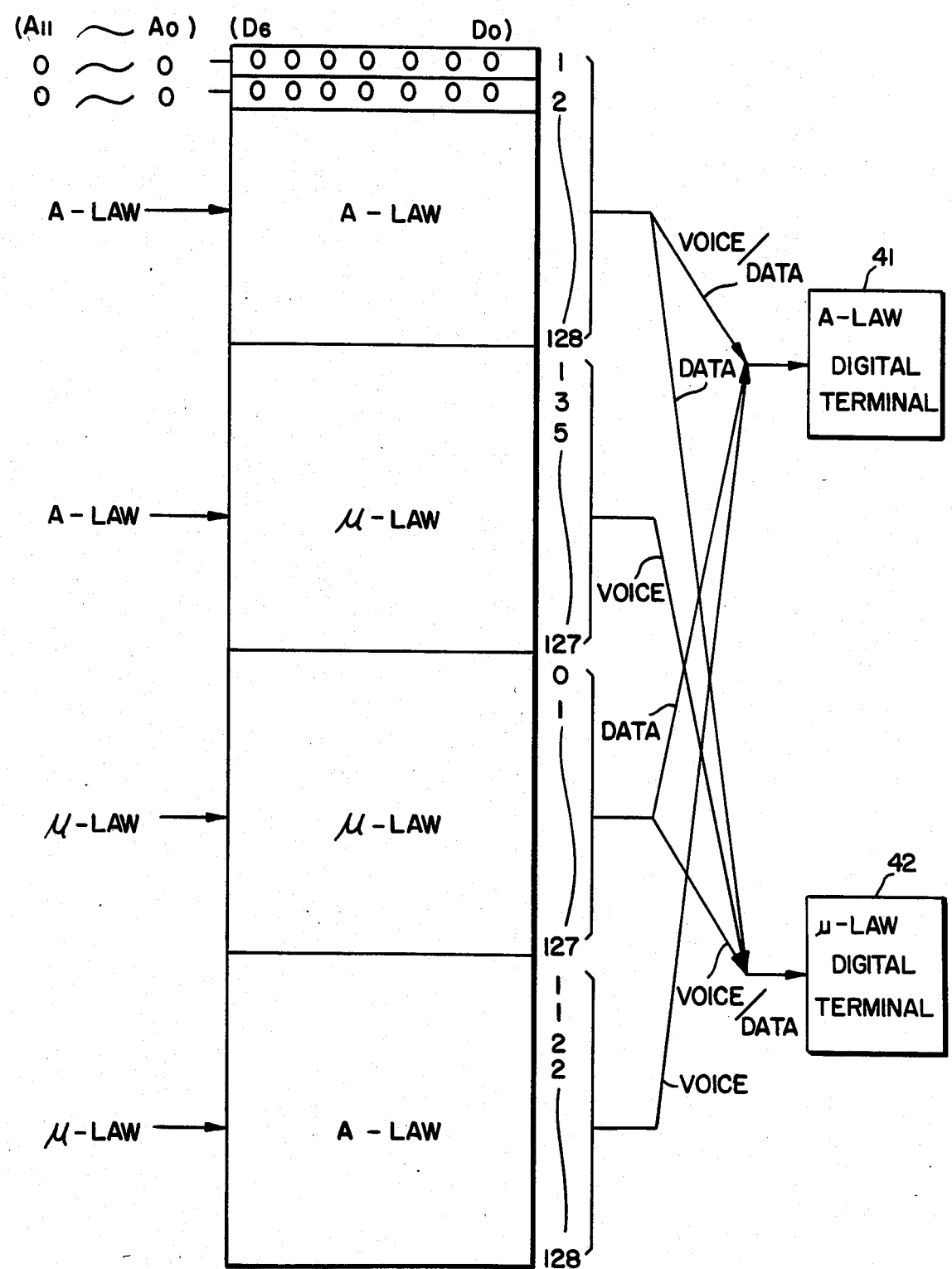
FIG. 4 is a profile of encoding law conversion by the encoding law conversion memory illustrated in FIG. 3.

An understanding of how voice and non-voice (data) signals are converted from one encoding law to another can be gained from the profile illustrated in FIG. 4. As indicated in FIG. 4, the encoding law conversion memory 24 includes four conversion region types: A-law to A-law; A-law to $\mu$-law; $\mu$-law to $\mu$-law; and $\mu$-law to A-law. One of these four regions is designated by the value of the pad mode bits $M_1$ and $M_0$ during each time slot, while simultaneously the pad control bits $C_2$, $C_1$ and $C_0$ determine the attenuation value. As indicated by the labelled paths between the four regions and A-law 41 and $\mu$-law 42 terminals, data can be transmitted to either encoding law terminal 41 or 42 so long as no encoding law conversion occurs. Thus, the output of both A-law to A-law and $\mu$-law to $\mu$-law "conversion" can be supplied to either of the terminals 41 and 42 when data signals are being transmitted. However, when voice signals are switched through digital switching module 10, the terminal to which the signals are supplied must match the resulting encoding law from the conversion or nonconversion. The examples given earlier will be used to further explain this difference.

In a time slot in which the control bits are "001000" (the first example given above), conversion from A-law to $\mu$-law is designated by the pad mode bits $M_1$ and $M_0$, without attenuation. Thus, an A-law encoded PCM signal supplied via the input lines to address bits A6–A0 will be converted into a $\mu$-law encoded PCM output signal at bits D6–D0. Therefore, only voice signals can be sent to the A-law terminal 41, as indicated by "VOICE" on the line connecting the $\mu$-law A-law region and A-law terminal 41.

In the second example given above, where the control data is "100011", nonconversion of an A-law encoded input signal is indicated by the pad mode bits $M_1$ and $M_0$ with 3 dB attenuation. Therefore, both voice signals and data can be sent to the A-law terminal 41, as indicated by the label "VOICE/DATA" on the line connecting the A-law—A-law region and the A-law terminal 41. Since there is no A-law or $\mu$-law encoding of data signals, data signals can also be sent to the $\mu$-law terminal 42 from the A-law—A-law region, as indicated in FIG. 4.

Sample bit patterns of addresses and data are included in Table 5, below, to illustrate the above described conversion and nonconversion on a bit level. Conversion from $\mu$-law to A-law and A-law to $\mu$-law by the encoding law conversion memory 24 is carried out on the basis of the above-mentioned CCITT Recommendation G.711.

Figure 5:
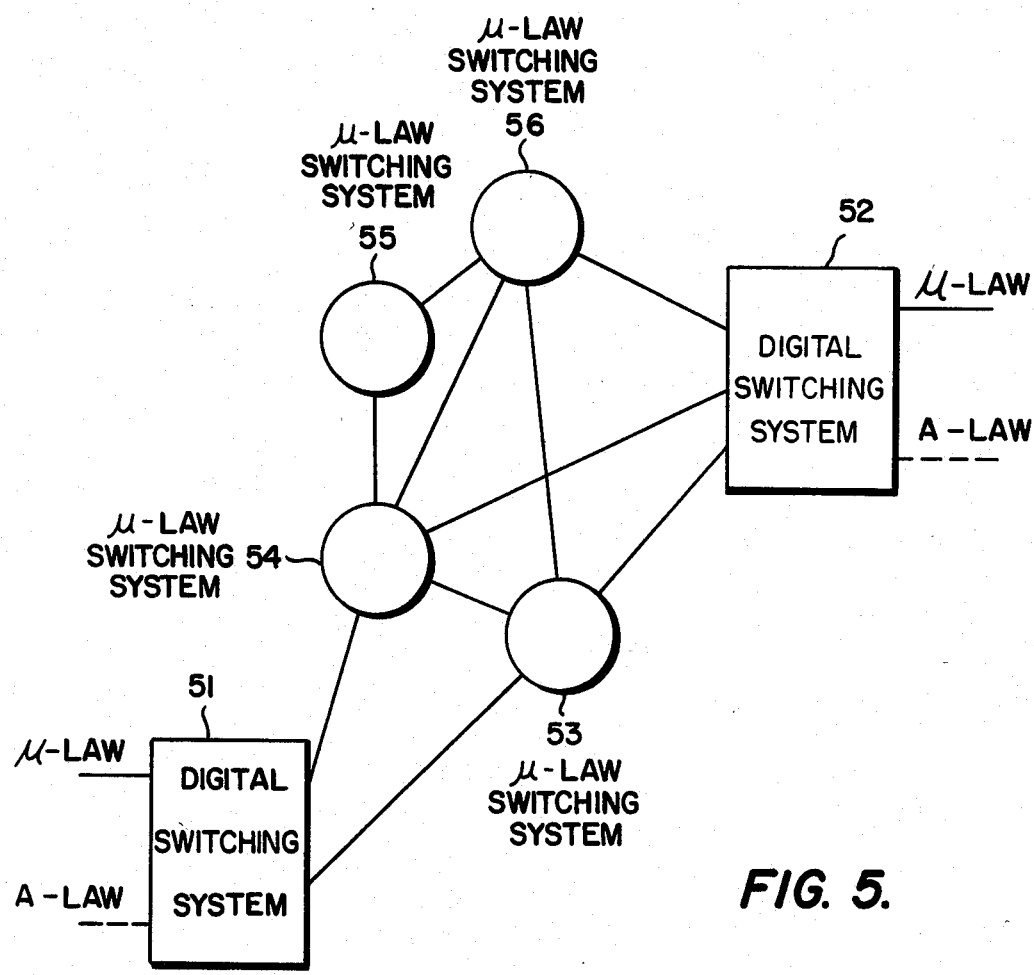
FIG. 5 is a block diagram of a digital switching network.

The digital switch module described above can be used in a digital switching network such as that illustrated in the block diagram of FIG. 5. The digital switching systems 51 and 52 comprise digital switch modules according to the present invention, so that $\mu$-law and A-law encoded data can be converted as necessary for transmission in a network of $\mu$-law switching systems 53–56.

TABLE 5

| | | ROM ADDRESS | | | | | | | ROM DATA (CONTENTS) | | | |
|---|---|---|---|---|---|---|---|---|---|---|---|---|
| | A11 | A10 | A9 | A8 | A7 | A6 | ~ | A0 | D6 | ~ | D0 | |
| A-LAW ↓ A-LAW | 0 | 0 | 0 | 0 | 0 | 0 | ~ | 0 → | 0 | ~ | 0 0 | A-law 1 |
| | 0 | 0 | 0 | 0 | 0 | 0 | ~ | 01 → | 0 | ~ | 0 1 | A-law 2 |
| | ⋮ | ⋮ | ⋮ | ⋮ | ⋮ | ⋮ | ⋮ | ⋮ | | | | |
| | 0 | 0 | 0 | 0 | 0 | 1 | ~ | 11 → | 1 | ~ | 1 1 | A-law 128 |
| | 0 | 0 | 0 | 0 | 1 | 0 | ~ | 0 → | 0 | ~ | 0 0 | 1db down of a A-law 1 |
| | ⋮ | ⋮ | ⋮ | ⋮ | ⋮ | ⋮ | | ⋮ | | | | |
| | 0 | 0 | 0 | 0 | 1 | 1 | ~ | 1 → | 1 | 1 0 | 1 0 1 | 1 1db down of A-law 128 |
| | ⋮ | ⋮ | ⋮ | ⋮ | ⋮ | ⋮ | | ⋮ | | | | |
| | 0 | 0 | 1 | 1 | 1 | 0 | ~ | 0 → | (A-LAW SILENT PATTERN) | | | ∞ pad of A-law 1 |
| | ⋮ | ⋮ | ⋮ | ⋮ | ⋮ | ⋮ | | ⋮ | | | | |
| | 0 | 0 | 1 | 1 | 1 | 1 | ~ | 1 → | (A-LAW SILENT PATTERN) | | | ∞ pad of A-law 128 |

TABLE 5-continued

| | ROM ADDRESS | | | | | | | ROM DATA (CONTENTS) | | | | | | | |
|---|---|---|---|---|---|---|---|---|---|---|---|---|---|---|---|
| | A11 | A10 | A9 | A8 | A7 | A6 | ~ | A0 | D6 | | ~ | | | D0 | |
| A-LAW ↓ μ-LAW | 0 | 1 | 0 | 0 | 0 | 0 | ~ | 0 | 1 | 1 | 1 | 1 | 1 | 1 | 0 μ-law 1 |
| | 0 | 1 | 0 | 0 | 0 | 0 | ~ | 01 → | 1 | 1 | 1 | 1 | 1 | 0 | 1 μ-law 2 |
| | ⋮ | | ⋮ | | ⋮ | | | | | ⋮ | | | | | |
| μ-LAW ↓ A-LAW | 1 | 0 | 0 | 0 | 0 | 0 | ~ | 0 | 1 | 1 | 1 | 1 | 1 | 1 | 1 A-law 128 |
| | 1 | 0 | 0 | 0 | 0 | 0 | ~ | 01 | 1 | 1 | 1 | 1 | 1 | 1 | 0 A-law 127 |
| | 1 | 0 | 0 | 0 | 0 | 0 | ~ | 10 | 1 | 1 | 1 | 1 | 1 | 0 | 1 A-law 126 |
| | ⋮ | | ⋮ | | ⋮ | | | | | ⋮ | | | | | |
| μ-LAW ↓ μ-LAW | 1 | 1 | 0 | 0 | 0 | 0 | ~ | 0 | 0 | 0 | 0 | 0 | 0 | 0 | 0 μ-law 127 |
| | 1 | 1 | 0 | 0 | 0 | 0 | ~ | 01 | 0 | 0 | 0 | 0 | 0 | 0 | 1 μ-law 126 |
| | ⋮ | | ⋮ | | ⋮ | | | | | ⋮ | | | | | |

A similar network could be formed using A-law switching systems in place of the μ-law switching system 53–56.

As described previously, a digital switch module according to the present invention includes an encoding law conversion memory 24 and a control memory 29 which designates the type of conversion performed during a time slot. Accordingly, it is possible to dynamically control the conversion or nonconversion of encoding laws and to send or receive non-voice data immediately before or after a voice signal by including control signals indicating the beginning and end of non-voice data immediately before and after the non-voice data. By including attenuation data in the conversion memory, level matching between different types of switching networks is easily accomplished simultaneously with the conversion or nonconversion of encoding laws.

The many and advantages of the present invention are apparent from the detailed specification, and thus it is intended by the appended claims to cover all such features and advantages of the switch which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A digital switch module for time division switching of data between digital channels used for input and output, the switching occurring in time slots, the digital channels having corresponding encoding laws and carrying digitized voice signals; said module comprising:
   conversion memory means for converting the digitized voice signals on the digital channels from a first digital encoding law directly to a second digital encoding law using conversion data previously stored in said conversion memory means; and
   control memory means for designating the conversion data used by said conversion memory means during each of the time slots in dependence upon the corresponding encoding laws of the digital channels used for input and output during each of the time slots.

2. A digital switch module as recited in claim 1, wherein said conversion memory means comprises:
   first input means for receiving at least part of the digitized voice signals from the digital channels used for input; and
   output means for outputting digitized voice signals to the digital channels used for output after conversion using the conversion data designated by said control memory means.

3. A digital switch module as recited in claim 2,
   wherein said input means receives the at least part of the digitized voice signals from the digital channels used for input as a first partial address,
   wherein said control memory means outputs control data designating the conversion data used for converting the digitized voice signals during each of the time slots, and
   wherein said conversion memory means further comprises second input means for receiving the control data as a second partial address, the first and second partial addresses completely specifying output data to be output from said output means as a single digitized voice signal on one of the digital channels used for output during each of the time slots.

4. A digital switch module as recited in claim 3, wherein said output means comprises:
   a read only memory operatively connected to said first and second input means; and
   output signal means, operatively connected to said read only memory and the digital channels used for output, for transmitting the output data to the digital channels used for output.

5. A digital switch module as recited in claim 1, further comprising a control unit, operatively connected to said control memory means and said conversion memory means, for controlling switching and conversion in said digital switch module.

6. A digital switch module as recited in claim 5,
   wherein said control unit generates a write address and control data to be written in said control memory means at the write address, and
   wherein said digital switch module further comprises:
   read address counter means for generating a read address which sequentially changes in synchronism with changes in the time slots; and
   selector means for selecting between the read address and the write address, said control memory means designating the conversion data when said selector means selects the read address.

7. A digital switch module as recited in claim 1,
   wherein the conversion data previously stored in said conversion memory means converts from the first digital encoding law to the second digital encoding law when the first digital and second encoding laws are different and performs no conversion when the first and second digital encoding laws are identical, and
   wherein said digital switch module also switches non-voice digital signals from the digital channels used for input to the digital channels used for output without conversion, using one of the conversion data which performs no conversion.

8. A digital switch module as recited in claim 1, wherein said conversion memory means further previously stores level attenuation data and said control memory means includes means for designating an attenuation value indicating which of the level attenuation data is to be used during each of the time slots.

9. A digital switch module as recited in claim 8, wherein said conversion memory means comprises:
first input means for receiving at least part of the digitized voice signals from the digital channels used for input; and
output means for outputting digitized voice signals to the digital channels used for output after conversion using the conversion data designated by said control memory means.

10. A digital switch module as recited in claim 9, wherein said input means receives the at least part of the digitized voice signals from the digital channels used for input as a first partial address,
wherein said control memory means outputs control data designating the conversion data used for converting the digitized voice signals during each of the time slots, and
wherein said conversion memory means further comprises second input means for receiving the control data as a second partial address, the first and second partial addresses completely specifying output data to be output from said output means as a single digitized voice signal on one of the digital channels used for output during each of the time slots.

11. A digital switch module as recited in claim 10, wherein said output means comprises:
a read only memory operatively connected to said first and second input means; and
output signal means, operatively connected to said read only memory and the digital channels used for output, for transmitting the output data to the digital channels used for output.

12. A digital switch module as recited in claim 8, further comprising a control unit, operatively connected to said control memory means and said conversion memory means, for controlling switching and conversion in said digital switch module.

13. A digital switch module as recited in claim 12, wherein said control unit generates a write address and control data to be written in said control memory means at the write address, and
wherein said digital switch module further comprises:
read address counter means for generating a read address which sequentially changes in synchronism with changes in the time slots; and
selector means for selecting between the read address and the write address, said control memory means designating the conversion data when said selector means selects the read address.

14. A digital switch module as recited in claim 8, wherein the conversion data previously stored in said conversion memory means converts from the first digital encoding law to the second digital encoding law when the first and second digital encoding laws are different and performs no conversion when the first and second encoding laws are identical, and
wherein said digital switch module also switches non-voice digital data signals from the digital channels used for input to the digital channels used for output without conversion, using one of the conversion data which performs no conversion.

15. A method for switching digital data from input channels to output channels, the input and output channels having corresponding encoding laws and carrying at least digitized voice signals, said method comprising the steps of:
(a) storing conversion data in a conversion data memory prior to performing any switching; and
(b) switching the digital data from one of the input channels to one of the output channels with conversion of a digital first encoding law corresponding to the one of the input channels to a second digital encoding law corresponding to the one of the output channels in accordance with the conversion data in an all-digital process.

16. A method as recited in claim 15, wherein step (a) comprises the step of storing every possible combination of encoding law conversion including cases in which the first digital encoding law is identical to the second digital encoding law.

17. A method as recited in claim 16, further comprising the step of (c) specifying a type of conversion in dependence upon the first and second digital encoding laws.

18. A method as recited in claim 17, wherein said method is performed in a digital switch module for time division switching during time slots, and wherein said method further comprises the steps of:
(d) forming a first partial address in the conversion memory using the digital data from one of the input channels; and
(e) forming a second partial address from the type of conversion specified in step (c), the first and second partial addresses identifying a single location in the conversion memory.

19. A method as recited in claim 16, wherein the digital data includes digitized voice signals and non-voice signals, and wherein step (b) comprises the steps of:
(c) identifying the digitized voice and non-voice signals in the digital data; and
(d) performing conversion of encoding laws only for digitized voice signals.

* * * * *